United States Patent [19]
Ezzell et al.

[11] Patent Number: 4,780,199
[45] Date of Patent: Oct. 25, 1988

[54] BAR SCREEN CLEANER

[76] Inventors: John E. Ezzell, 1224 Lynn Acres Dr., Birmingham, Ala. 35215; Timothy G. Ezzell, 5259 Paramont Dr., Birmingham, Ala. 35210

[21] Appl. No.: 100,251

[22] Filed: Sep. 23, 1987

[51] Int. Cl.4 ............................................. B01D 35/02
[52] U.S. Cl. ...................................... 210/159; 210/162
[58] Field of Search ................... 210/159, 162, 97, 98; 15/246

[56] References Cited

U.S. PATENT DOCUMENTS

| 1,823,823 | 9/1931 | Dundas et al. | 210/159 |
| 3,482,698 | 12/1969 | Ostnas | 210/159 |
| 4,265,750 | 5/1981 | Meunier | 210/159 |
| 4,392,952 | 7/1983 | Fechter et al. | 210/159 |

FOREIGN PATENT DOCUMENTS 2103739 7/1979 Fed. Rep. of Germany ...... 210/159

Primary Examiner—Peter Chin
Assistant Examiner—K. M. Hastings
Attorney, Agent, or Firm—Jennings, Carter, Thompson & Veal

[57] ABSTRACT

A bar screen cleaner utilizes a reciprocal carriage mounted downstream of a vertical bar screen to move a cleaning rake vertically to clean accumulation from the screen. The cleaning rake is pivotally mounted to the carriage such that the rake is positively urged into engagement with the bar screen as the carriage reaches its lowermost position. The rake is latched in a screen engaging position during the upstroke of the carriage and is released as the carriage reaches its uppermost position.

15 Claims, 4 Drawing Sheets

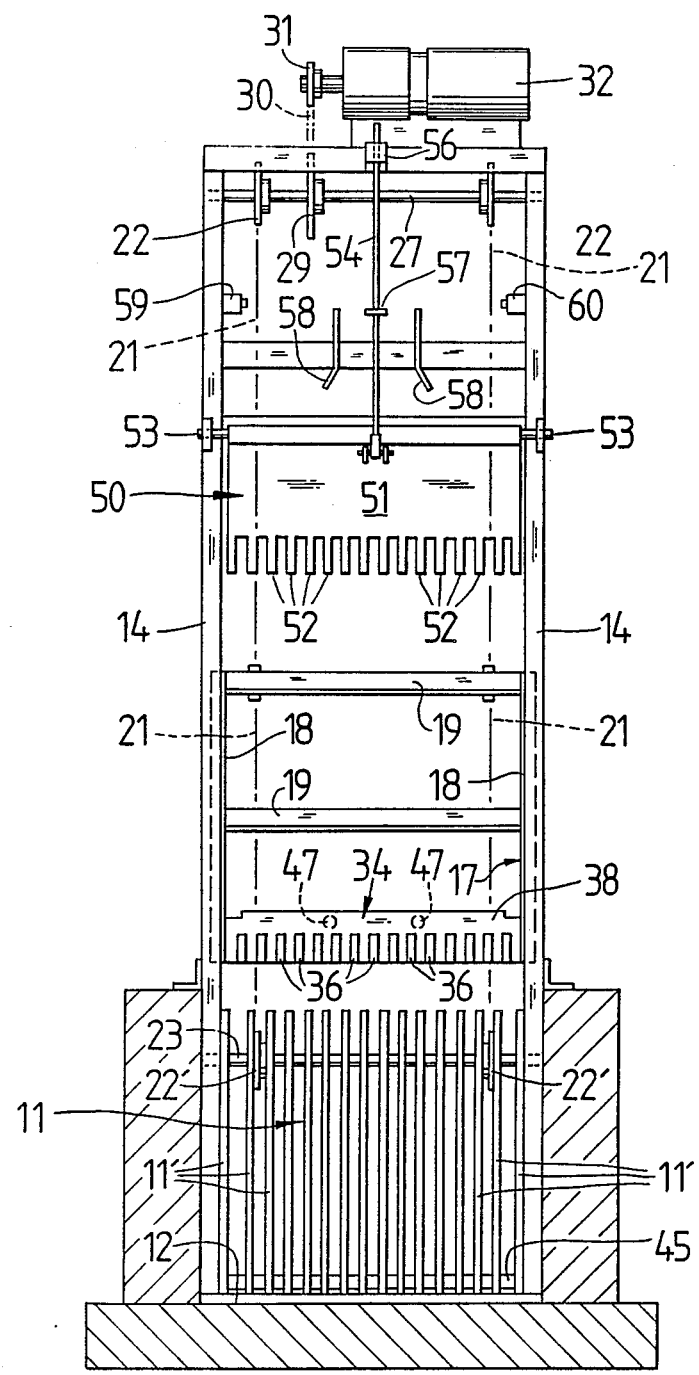

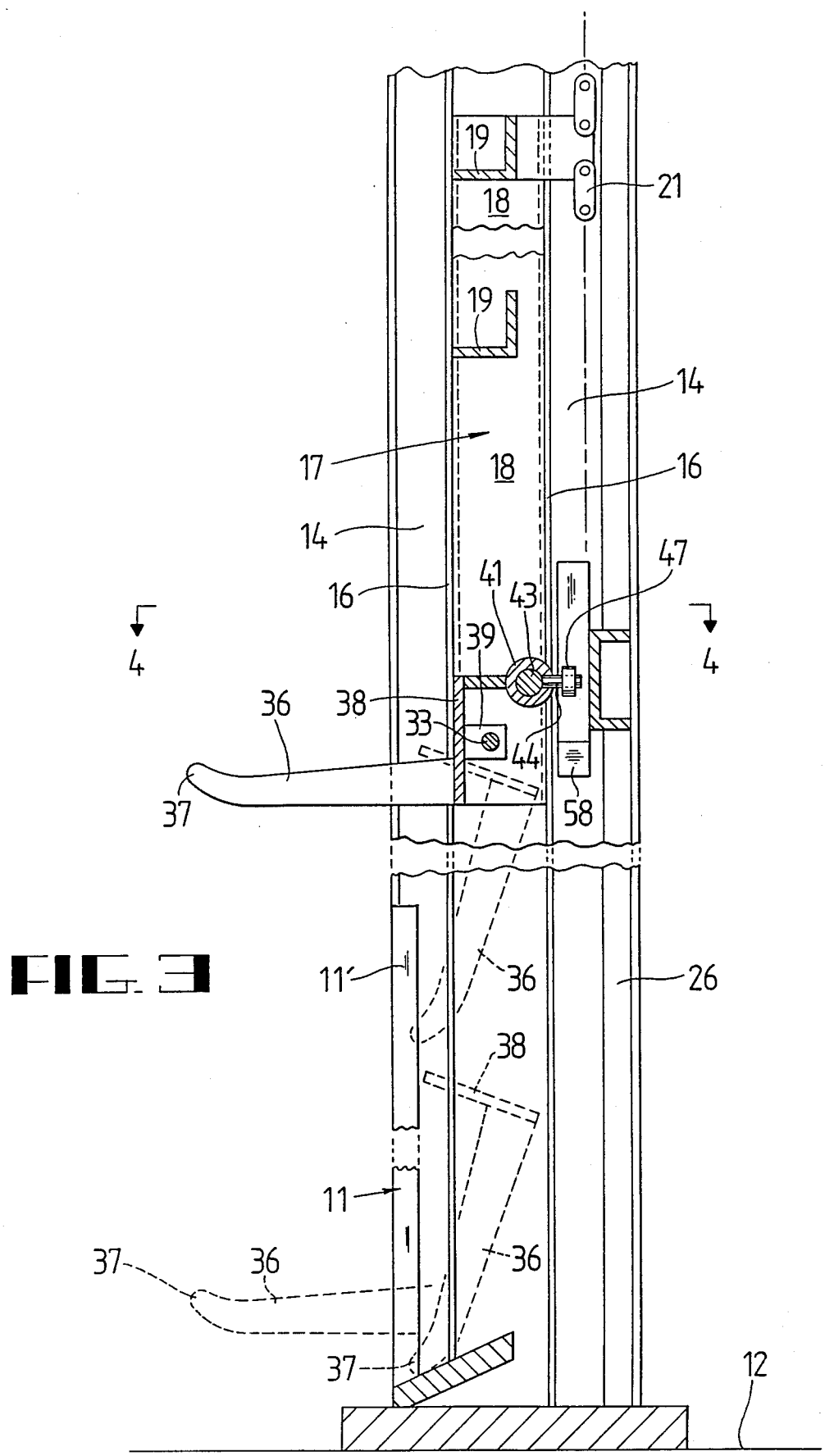

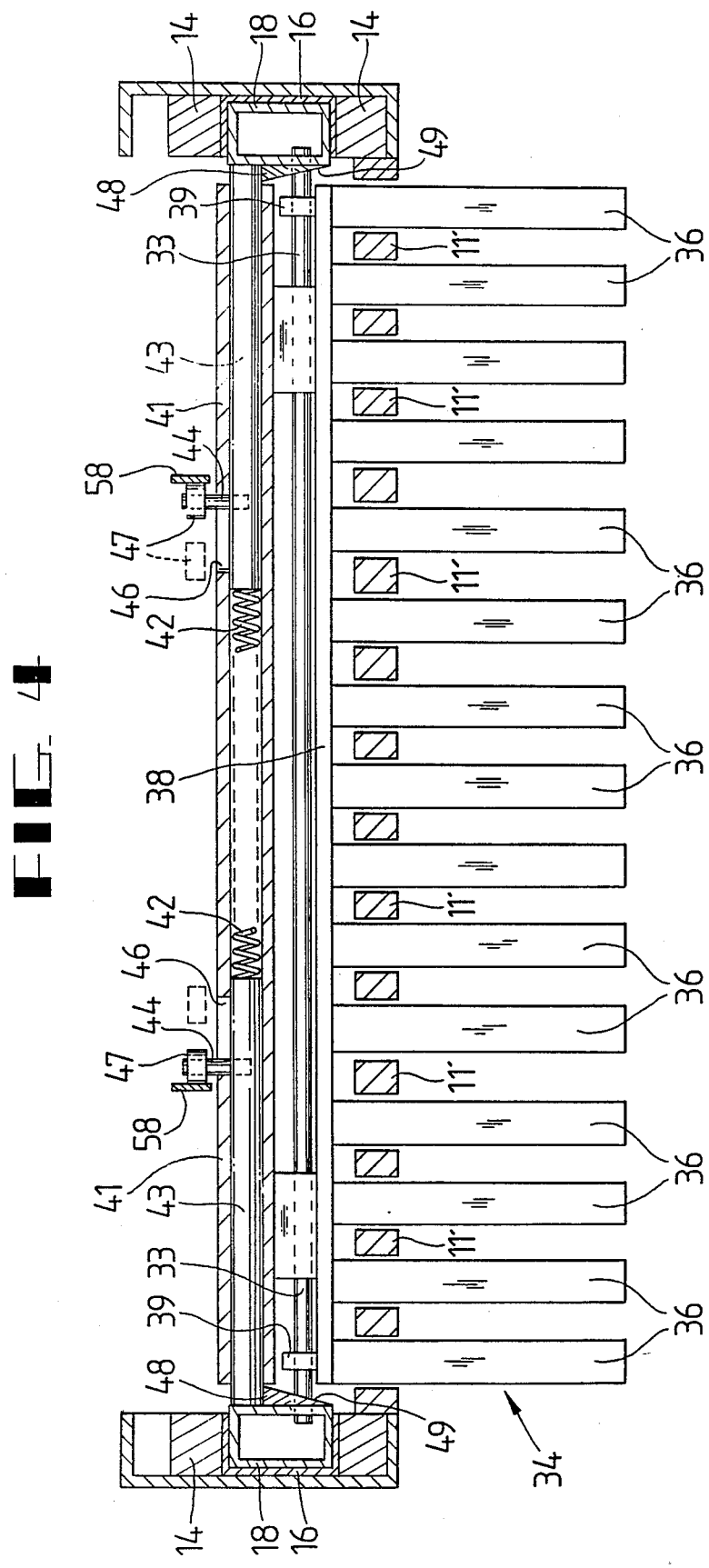

BAR SCREEN CLEANER

BACKGROUND OF THE INVENTION

The present invention relates to the field of wastewater treatment and the like and in particular relates to screening apparatus placed in the flow channels for removing larger materials from waste water passing therethrough. In even greater particularity, the present invention relates to apparatus for cleaning accumulated materials from such screens. In even greater particularity, the present invention relates to a cleaner apparatus for a vertical bar screen.

Bar screens of various configurations are well known in the art and there have been numerous cleaners developed to remove material held by such bar screens. Apparatus of this type which are known to us are generally large and complicated articulated members which depend upon the interaction of a number of jointed members or counter weights to properly position the various components of the apparatus.

For example, U.S. Pat. No. 1,823,823 discloses a screen cleaner, disposed on the upstream side of an inclined bar screen, which includes a rake member pivotally mounted for movement to a position proximal the bar screen responsive to gravity and a counterweight. Clearly, such apparatus was not capable of positively engaging the bar screen to assure removal of the accumulated material, but rather is subject to only partial engagement at the lowermost position on the bar screen. Continued failure to remove the lowermost accumulation in turn leads to greater residual accumulation and diminished capacity of the screen.

Another example of the complex nature of some of the prior art screen cleaners is found in U.S. Pat. No. 4,107,040 wherein a substantially vertical bar screen is cleaned by a rake member which is moved along an asymmetric S curve by a plurality of articulated arms and driven chains which are passed around a number of chain wheels to generate the asymmetric S curve. While this device may positively engage the bar screen, it is somewhat unwieldy and occupies a rather large volume.

Another screen cleaner which is more complex than our device is disclosed in U.S. Pat. No. 4,392,952.

While the aforementioned devices may be in some respects suitable for their intended use and function, they are believed to leave something to be desired in terms of their efficiency, economy, and in some cases, their maintenance and upkeep.

SUMMARY OF THE INVENTION

It is an object of our invention to provide a bar screen cleaner which is simple in its construction and operation such that it may be economically installed and maintained.

Yet another object of our invention is to provide a bar screen cleaner which does not occupy a substantial amount of space, thereby reducing the overall space required for utilization of such apparatus.

Still another object of our invention is to provide a bar screen cleaner which positively engages the material accumulated on the screen at all positions to improve the efficiency of such screens.

These and other objects and advantages are achieved in our invention through the use of a direct linear drive to move the rake member relative to the screen. The rake member is positively raised and lowered by the drive means between pre-selected positions such that in order for the drive means to reach its lower pre-selected position, the rake member must be urged into positive engagement with the bar screen. To accomplish this, the rake member is pivotally mounted at the bottom of a carriage which is reciprocally driven along a guide track located downstream of the bar screen. During the descent of the carriage and rake member, the rake member is suspended from its pivotal mounting in a non-screen engaging position and depends beneath the lowermost portion of the carriage. A set of rake guide members are inclined toward the bar screen and engage the rake member as the carriage nears the lower pre-selected position thereby urging the rake member toward the bar screen. Further movement by the carriage forces the rake member into engagement with the bar screen. As the carriage reaches its lowermost position, the rake member is locked into position so as to remain in engagement with the bar screen as the drive means raises the carriage to its upper position. At the upper position a scraper member engages the rake member to remove material therefrom and the rake member is unlocked whereupon it pivots under the influence of gravity into its suspended non-screen engaging position.

In as much as the vertical motion of the carriage and rake member are linear, it will be appreciated that a minimal amount of space is required for the operation of our apparatus. By utilizing a chain drive to move the carriage, the overall height of the apparatus is also minimized, thereby providing a compact, simple yet superior bar screen cleaner.

BRIEF DESCRIPTION OF THE DRAWINGS

Apparatus embodying features of our invention are depicted in the accompanying drawings which form a portion of this disclosure and wherein:

FIG. 2 is a front elevational view of the apparatus;

FIG. 3 is a partial side elevational view showing the lowermost portion of the apparatus; and FIG. 4 is a sectional plan view taken along line 4—4 of FIG. 3.

DESCRIPTION OF A PREFERRED EMBODIMENT

Figure 1:
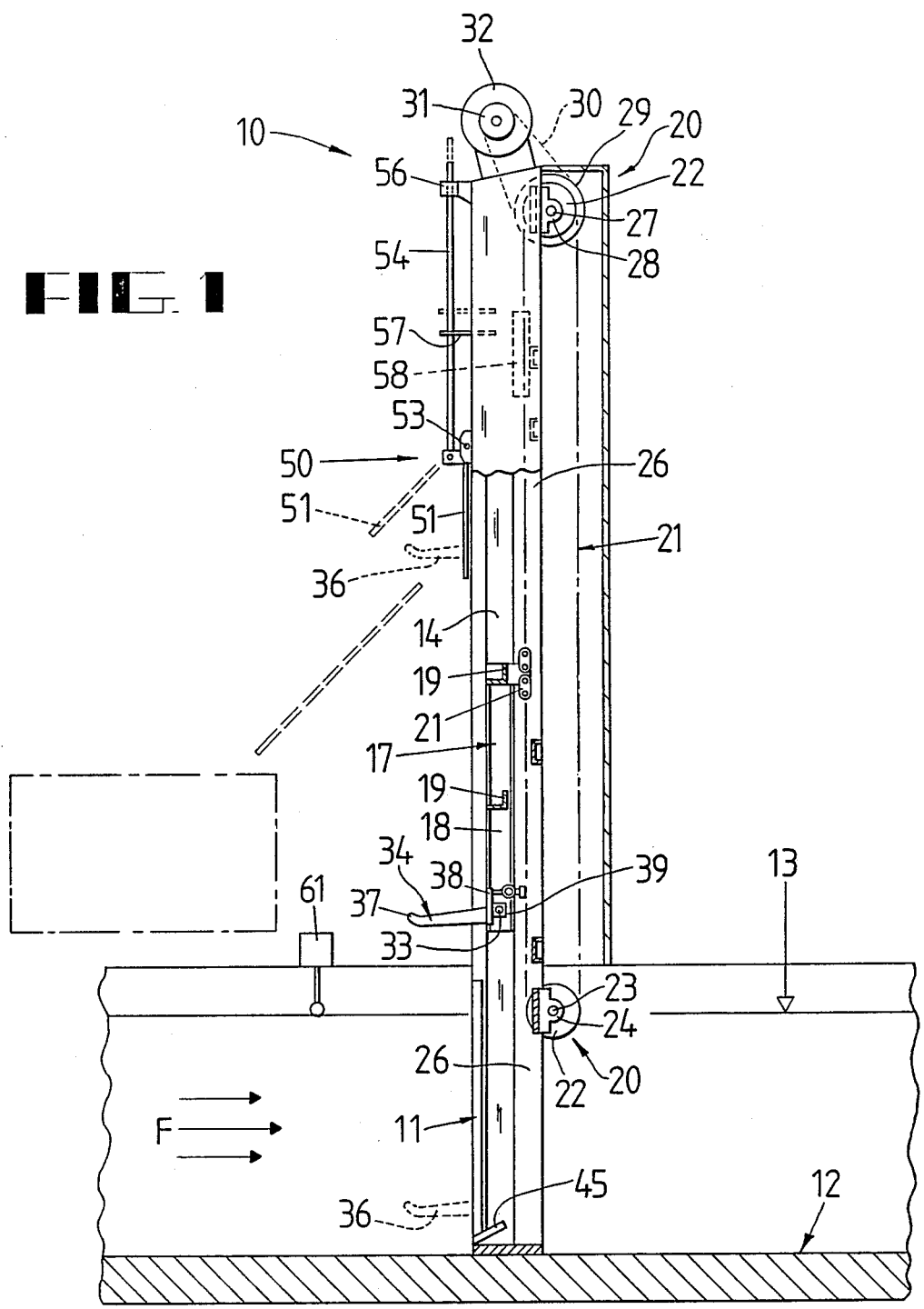
FIG. 1 is a partial sectional side elevational view of the apparatus.

Referring to the drawings for a better understanding of the invention, it will be appreciated that the present invention depicted generally at 10 is mounted downstream of a bar screen 11 which is in turn mounted within a channel 12 through which waste water is caused to flow in the direction of the arrow F. The bar screen 11 is formed by a plurality of parallel generally vertically aligned bars 11' which are anchored only at the base of the channel 12 and are not otherwise interconnected or supported. Of course, the bars 11' extend to above the water level indicated by line 13.

A set of inwardly facing guide tracks 14 are positioned parallel to the bar screen 11 and downstream thereof. Although downstream from the screen 11, the guide tracks remain proximal the bar screen 11 within the channel 12. The opposed inwardly facing surfaces of the guide tracks 14 have formed thereon a bearing surface 16, made from a durable polymer such as Teflon ® or the like which is resistant to wear and chemical reaction. A carriage 17, comprising a pair of elongated runners 18 slidably mounted with said guide tracks 14 and a plurality of cross members 19 connecting the runners 18, is positioned for longitudinal movement within said guide tracks 14 parallel to the screen 11. The carriage 17 is connected at the upper end thereof, to a drive means depicted in the drawing as a chain drive 20 comprising at least one continuous chain 21 mounted for movement about a pair of spaced apart sprockets 22 and 22'. The lower sprockets 22' are mounted on a shaft 23 secured in bearings 24 supported by a frame 26 which supports the guide tracks 14. The upper sprockets 22 are mounted on a drive shaft 27 also supported in bearing 28 carried by frame 26. The drive shaft 27 has mounted thereon a drive sprocket 29 which is connected by a drive chain 30 to an output sprocket 31 of a reversible electric motor 32.

Referring to FIGS. 3 and 4, it may be seen that the runners 18 of carriage 17 support a horizontally disposed rake shaft 33 upon which a rake member 34 is mounted. The rake member 34 includes a plurality of teeth 36 which are aligned with the spaces between the bars 11' of bar screen 11 such that the teeth 36 may extend through such spaces when the screen 11 is interstitially engaged by the rake member 34. Each tooth 36 includes an upwardly curved tip 37 and is mounted to a perpendicular planar member 38. The planar member 38 is attached to a sleeve 39 through which the rake shaft 33 passes to support the rake member 34. Also attached to the planar member 38 in opposed relation to the teeth 37 is a latching tube 41 which extends substantially the width of the rake member 34. A compression spring 42 is positioned within the latching tube 41 and a pair of plungers 43 are inserted at each end of the latching tube 41 such that the plungers 43 are urged outwardly by the spring 42. Each plunger 43 has a radially extending pin 44 affixed thereto which passes through a longitudinally formed slot 46 in the tube 41. Each pin 44 carries a cam roller 47 on the end thereof external to the tube 41. It may be seen that the plungers 43 are thus laterally movable only in so far as the associated pin 44 is movable within its slot 46. Formed on the elongated runner 18 is a stop 48 which includes a cam surface 49 which is positioned relative to the rake shaft 33 such that pivotal motion of the rake member about the shaft from a depending position to a bar screen engaging position urges the outer end of the plungers 43 against the cam surface which urge the plungers into the tubes 41 thereby compressing spring 42. Further rotation past the cam surface 49 releases the plunger 43 into registry with the stop 48 such that the rake member 34 is locked in its bar screen engaging position, which is generally horizontal and is designed to be a load bearing position. Positioned at the bottom of the bar screen 11 and guide track 14 is a rake guide 45 inclined toward the bar screen 11 for engaging the tip 37 of the rake member 34 and guiding the same toward the bar screen 11.

Referring to FIG. 1 and 2, it may be seen that the frame 26 also supports a stripper assembly 50 which includes a stripper plate 51 having a plurality of fingers 52 extending therefrom and aligned for interstitial engagement with the teeth 36 of the rake member 34. The stripper plate 51 is pivotally mounted along the edge thereof opposite the fingers 52 on a shaft 53 carried by the frame member 26. A stripper lift arm 54 is pivotally connected to the plate 51 and extends upwardly through a guide 56 at the top of the frame 26. Intermediate the plate 51 and guide 56 a stripper paddle 57 is connected to the arm 56 and extends perpendicularly therefrom such that it engages the upper cross member 19 of carriage 17 as the carriage 17 moves upward, thereby causing the plate 51 and fingers 52 to pivot outwardly and sweep trash or material off of the rake teeth 36. Also mounted to the frame 26 above the stripper plate and behind the guide track 14 is a set of cam strips 58 which engage the cam roller 47 and urge them toward each other as the carriage 17 moves upward.

The upward movement of the carriage 17 is limited by a limit switch 59 mounted to be actuated by the carriage 17 or by an actuator carried by the chain 21 when the carriage has reached a predetermined height. Likewise a limit switch 60 is actuated when the carriage reaches its lowermost position. Each limit switch may be used to reverse the direction of the motor 32 and thus the direction of motion of the carriage 17 or may be part of a more complicated control system.

The operation of our apparatus will now be described with reference primarily to FIG. 1 and 3. Beginning with FIG. 3 and with note of the position of the teeth 36 shown in dotted line, it will be appreciated that the dotted line representative of the teeth 36 indicates their position as the carriage 17 is urged from its upper position to its lowermost position. The rake member 34 is suspended from shaft 33 by its own weight such that the teeth 36 hang beneath the lowermost portion of the carriage 17. The motor 32, through drive chain 30 and drive shaft 27, urges the carriage 17 downward and thus urges the teeth 36 into engagement with the rake guide 45. The curved tips 37 and the angle of the rake guide 45 are such that as the carriage 17 is urged lower, the rake member 34 is urged pivotally about shaft 33 into interstitial engagement with the bar screen 11. As noted hereinabove, when the carriage reaches its lowermost position, the rake member 34 is fully engaged with the bar screen 11 and is latched in its load bearing position. At this point, limit switch 60 is actuated to halt the descent of the carriage. If the screen cleaner 10 is designed for continuous operation, the motor 32 reverses and the carriage 17 and rake member 34 are raised thereby removing accumulated materials from the bar screen.

During the upward movement of the carriage, the teeth 36 are engaged by the fingers 52 of the stripper assembly 50 and the stripper paddle 57 is urged upwardly by the cross member 19, thus the accumulated material is scooped from the teeth 36 into a hopper or conveyor or into a chute for removal as is well known. The chute may be yieldable to permit passage of the teeth 36 in their extended position.

The cam rollers 47 are then engaged by the cam strips 58 and urged inwardly to release the plungers 43 from behind the stops 48 such that the rake member 34 again pivots to its non-screen engaging position as shown in phantom in FIG. 3. Limit switch 59 is then actuated to reverse motor 32.

It will further be appreciated that the control of the above cycle is a matter of choice in that the motor may be electronically or electro-mechanically controlled to operate continuously or intermittently or periodically as desired. Further, the apparatus may include a float siwtch 61 to initiate operation upon a predetermined depth of waste water being detected in the channel as is well known in the art. Regardless of the control utilized in should be clear that the rake member 34 is positively urged into full engagement with the bar screen 11 as the carriage descends thereby assuring that minimal residual material will be left at the bottom of the screen.

While we have shown our invention in one form, it will be obvious to those skilled in the art that it is not so limited but is susceptible of various changes and modifications without departing from the spirit thereof.

What we claim is:

1. In a bar screen apparatus for screening waste water with a plurality of generally vertically oriented bars forming the screen, a screen cleaner comprising:
   (a) a rake member having a plurality of teeth for interstitial engagement with said bar screen;
   (b) drive means for selectively moving said rake member linearly parallel to said bars between a lowered position and a raised position; and
   (c) positioning means for orienting said rake member in a load hearing position and a non-load bearing position responsive to said drive means such that said rake member achieves full interstitial engagement as it is moved to said lowered position; and
   (d) said rake member being structured and attached to said positioning means so that said plurality of teeth are positioned parallel to said bars in said non-load bearing position.

2. The screen cleaner as described in claim 1 further comprising stripper means for removing material carried by said rake member proximal said raised position.

3. The screen cleaner as described in claim 2 wherein said positioning means comprises:
   (a) a carriage member connected to said drive means for movement between said raised and lowered positions;
   (b) a horizontally extending shaft supported within said carriage member and supporting said rake member thereon for pivotal motion thereabout;
   (c) releasable latching means latching said rake means in a selected position;
   (d) means for pivoting said rake member about said shaft to said selected position responsive to movement of said rake member by said drive means; and
   (e) release means for releasing said latch means responsive to a predetermined movement of said rake member by said drive means.

4. The screen cleaner as defined in claim 3 wherein said means for pivoting comprises a rake guide mounted at said lowered position to engage said teeth of said rake member and inclined toward said bar screen such that said teeth are urged toward said bar screen as said drive means urges said rake member to said lowered position; and wherein said release means is positioned to release said latching means when said rake member reaches the raised position to allow said rake member to pivot about said shaft.

5. The screen cleaner as defined in claim 3 wherein said drive means comprises:
   (a) at least one continuous chain member;
   (b) a pair of vertically spaced sprockets aligned in a vertical plane engaging said chain member and defining the path of travel thereof;
   (c) a motor operably connected to one of said sprockets for imparting rotational movement thereto to drive said chain member; and
   (d) means for reversing the direction of rotation of said sprockets responsive to the movement of said chain members through a predetermined distance.

6. The screen as defined in claim 5 further comprising an elongated guide within which said carried member is urged by said drive means, said carriage member being attached to said chain member for concomitant motion therewith.

7. The screen cleaner as defined in claim 5 further comprising means for actuating said motor responsive to the level of said waste water proximal said bar screen.

8. The screen cleaner as defined in claim 5 wherein said means for reversing comprises a plurality of switches connected to said motor to control the direction of rotation thereof and a plurality of actuators carried by said chain member for engaging a selected one of said switches at predetermined location such that said motor is responsive to the position of said chain member.

9. The cleaner as defined in claim 2 wherein said stripper means comprises a generally planar member extending coextensively laterally with said rake member and having a plurality of fingers extending therefrom for interstitial engagement with the teeth of said rake member and being pivotally mounted distal said fingers for movement about a horizontal axis; and means for lifting said planar member from engagement with said rake member at said raised position.

10. In a bar screen apparatus for screening waste water with a plurality of generally vertically oriented bars forming a bar screen, a screen cleaner comprising: a rake member having a plurality of teeth for interstitial engagement with said bar screen; drive means for selectively moving said rake member linearly between a lowered position and a raised position; positioning means for orienting said rake member in a load bearing position and a non-load bearing position responsive to said drive means, including a carriage member connected to said drive means for movement between said raised and lowered position, a horizontally extending shaft supported within said carriage member and supporting said rake member thereon for pivotal motion thereabout; releasable latching means latching said rake means in a selected position, including a tubular member affixed to said rake member and movable therewith about said shaft, an outwardly biased plunger mounted within said tubular member and biased for extension through one end of said tubular member, and a stop member; means for pivoting said rake member about said shaft to said selected position responsive to movement of said rake member by said drive means including a rake guide mounted at said lowered position to engage said teeth of said rake member and inclined toward said bar screen such that said teeth are urged toward said bar screen as said drive means urges said rake member to its lowered position; release means for releasing said latch means said rake member reaches the raised position to allow said rake member to pivot about said shaft.

11. The screen cleaner as defined in claim 10 wherein said stop member includes a cam surface adapted for urging said plunger inward during rotation of said rake member responsive to engagement thereof with said rake guide.

12. The screen cleaner as defined in claim 10 wherein said release means comprises:
   (a) a cam roller attached to said plungers and extending laterally from said tubular member through slots therein perpendicular to the direction of travel of said carriage member; and
   (b) a cam surface mounted for engagement with said cam roller for urging said plunger axially inwardly of said tubular member.

13. In a bar screen apparatus for screening waste water with a plurality of vertically oriented bars forming the screen apparatus for cleaning the bar screen comprising:

(a) a rake member having a plurality of spaced apart teeth for interstitial engagement with said bar screen;

(b) carriage means for moving said rake member in a plane parallel to said bar screen, said carriage means supporting said rake member on a shaft passing through said rake member distal said teeth such that said rake member is free to pivot thereon about a horizontal axis;

(c) frame means extending generally vertically downstream of said bar screen for guiding said carriage;

(d) motor means for urging said carriage selectively to a raised position and a lowered position;

(e) means for urging said rake member into positive engagement with said bar screen at said lowered position by urging said teeth upwardly as said carriage means descends; and (f) releasable latching means including a tubular member affixed to said rake member and movable therewith about said shaft, an outwardly biased plunger mounted within said tubular member and biased for extension axially from said tubular member, and a stop member formed on said carriage for engaging said plunger and preventing downward rotation of said rake member relative to said shaft.

14. Apparatus as defined in claim 13 further comprising means for actuating said motor responsive to the level of waste water proximal said bar screen.

15. Apparatus as described in claim 13 further comprising stripper means for removing material carried by said rake member proximal said raised position.

* * * * *